Dec. 3, 1929.　　　　W. H. WOOD　　　1,738,027
WORK LOADING DEVICE
Filed June 22, 1928
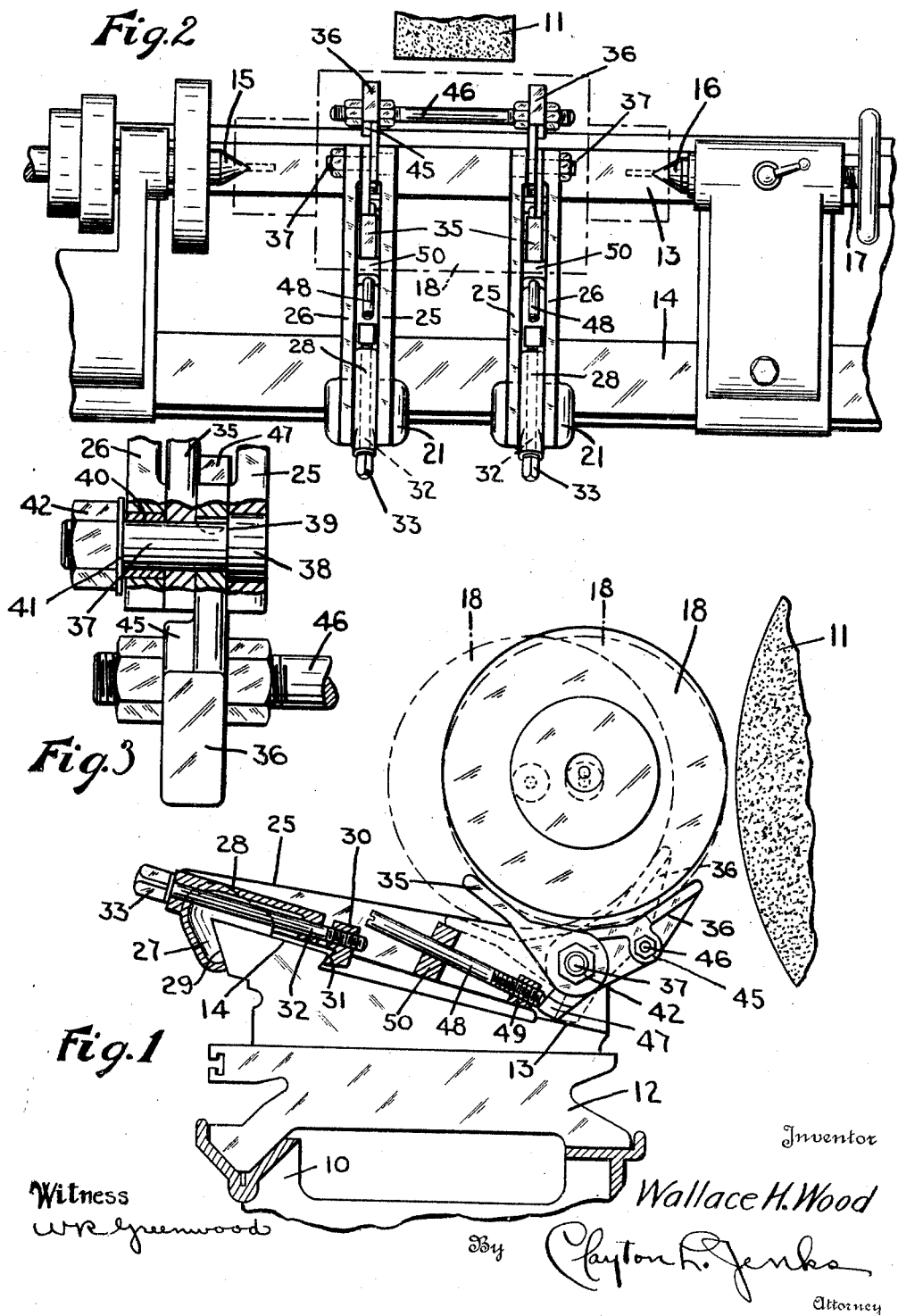
Inventor
Wallace H. Wood
By Clayton L. Jenks
Attorney
Witness
W. R. Greenwood Patented Dec. 3, 1929

1,738,027

UNITED STATES PATENT OFFICE

WALLACE H. WOOD, OF WAVERLEY, MASSACHUSETTS, ASSIGNOR TO NORTON COMPANY, OF WORCESTER, MASSACHUSETTS, A CORPORATION OF MASSACHUSETTS

WORK-LOADING DEVICE

Application filed June 22, 1928. Serial No. 287,453.

My invention relates to work loading devices and more particularly to a work conveying and positioning device for cylindrical work as applied to machine tools, such as a grinding machine.

It is common practice in the art of grinding large cylindrical rolls, such as those used for the rolling of metal foil, for the work piece to be manually placed into the machine or to be conveyed by means of an overhead crane. If the operator has to do it by hand, it is usually necessary for him to pick up the heavy work piece from the floor and then, leaning over the front of the machine, hold the piece in position while moving the centers into engagement therewith. It can readily be seen that the constant repetition of such laborious operations would be extremely fatiguing to the operator and likely to be a cause of injury to either the operator or the roll to be ground if the latter should slip and accidentally contact with the rapidly revolving grinding wheel.

To relieve this situation, it is desirable to employ a work loading device interposed between the head and tail stocks of a grinding machine to convey work pieces of large diameters to the work supporting members, but a construction which will serve adequately for this purpose should not be of such bulk and size as to be cumbersome and hinder free access to the grinding operation.

It is therefore one object of my invention to provide a work loading device which is so constructed that work pieces of various sizes may be easily placed in the approximately correct position for supporting engagement by the work centers.

A further object is to provide a fixture which may be removably mounted on the machine table or base and which is so constructed that a work piece may be conveyed thereon to a position beneath the center line and then elevated to engage the centers.

To the accomplishment of these objects, and certain others as may hereinafter appear, various features of the present invention consist in certain devices, combinations and arrangement of parts fully set forth hereinafter and covered by the claims appended hereto, the advantages of which will be readily understood by those skilled in the art.

The various features of the present invention will be explained in connection with the accompanying drawings, illustrating one form of the invention, in which:

Fig. 1 is a fragmentary view, partly in section, of a work loading device mounted on the bed of a grinding machine;

Fig. 2 is a fragmentary plan view of the device showing the phantom outline of a work piece in the correct grinding position; and Fig. 3 is an enlarged fragmentary view, partly in section, showing the cradle pivot construction.

One embodiment of my invention which will serve for loading a large cylindrical roll into the centers of a grinding machine comprises a runway or guide way having a surface extending from the front of the machine towards the centers and the grinding wheel, so arranged that the work may be rolled rearwardly towards its operative position where it may be stopped beneath a line connecting the centers and then elevated for engagement with the centers by means of a movable support. A simple construction including both a runway and an elevating mechanism may include a flat track and a movable cradle arranged to receive the work from the track and to stop and position it correctly for engagement by the centers. One simple manner of elevating the work supporting cradle comprises mounting the cradle for tilting about a pivot located at one side of a vertical plane passing through the work center in its loading position. The elevated position of the cradle may be accurately adjusted by a suitable stop mechanism and the cradle may be provided with adjustable arms adapted to hold various sizes of work.

A work loading device embodying all of these features is shown in the drawings as adapted for use on a grinding machine of standard construction. The machine has a base 10 carrying a grinding wheel 11 mounted on suitable slideways thereon. A work table 12 slidably mounted on the base has suitable ways 13 and 14 for supporting various mechanical fixtures thereon and is provided with head and tail stock centers 15 and 16 which are of suitable construction and arranged to be moved relatively by means of a suitable hand screw 17 into supporting engagement with the work piece 18 to hold it during the grinding operation.

The work loading device, which is clamped to the ways 13 and 14, comprises two similar connected units 21 arranged to form the runway and the work carrying cradle, these units being spaced apart to support the opposite ends of a work piece. Each unit comprises two spaced parallel members 25 and 26 having their top surfaces plane and preferably rearwardly inclined towards the grinding element. The front portions of the members 25 and 26 constituting the runway have a depending lug 27 and a web 28 which connect the two spaced members 25 and 26 and are integral therewith.

The lug 27 is provided with a reentrant bearing surface 29 held into contact with a correspondingly relieved surface of the way 14 of the work table 12 and constitutes the stationary clamping member of the loading device. In order to clamp the lug 27 of the loading device to the inner edge of the way 14, I provide a movable wedge block 30 whose lower edge 31 is shaped to clamp against a correspondingly reentrant surface of the way 14. A bolt 32 passes through the web 28 and is screw threaded into the wedge block 30. The upper portion of the bolt 32 is terminated by the head 33 which is of adequate size to permit the adjustment of the wedge blocks 30. The inner extremities of the work loading device, beneath the work supporting centers and farthest removed from the operator, are supported by the flat-way 13 on the machine table.

The working supporting cradle is made up of two units, one mounted on each of the spaced runways 21. Each unit comprises a pair of extended arms 35 and 36, provided with surfaces adapted to contact with the work piece and support it at the point of tangency. These arms are pivotally mounted between the rearward extremities of the runways 25 and 26 and beneath their top surfaces, and have their pivot points located in back of a vertical plane passing through the work center in its initial loading position so that if the cradle is tilted rearwardly to carry the work towards the centers it will be simultaneously elevated. The arms of the cradle are mounted for adjustment relative to each other so that they can carry work pieces of different sizes. To this end, I provide a stud 37, one end of which carries an enlarged portion 38 which is pivotally mounted in a bearing in the runway 25. The shoulder 39 of this enlarged head forms a clamping flange which firmly clamps against the side face of the arm 36. The opposite end of this stud 37 passes through a sleeve 40 whose length is slightly greater than the width of the bearing surface to provide sufficient clearance between the side of the runway 26 and a washer 41, which is held in contact against the elongated portion of the sleeve 40 by the nut 42, thereby forming a flanged surface at this end of the bushing and limiting its free motion, yet firmly and rigidly clamping the supporting arms in the desired position between the shoulder 39 and the washer 41. The outside faces of the arms 36 are provided with bosses 45 of sufficient size to receive a coupling rod 46 forming a rigid connection between both elevating units so that they will move together.

In order that the rearward motion of the cradle may be regulated to prevent the work in its upward motion from striking and damaging the wheel, I provide each pair of arms with an extension 47 projecting from the pivot end of the arm 36 which is adapted to engage an adjustable stop comprising the bolt 48. When the work cradle is in an elevated position, this extension 47 contacts with the extended portion of the bolt 48 which is screw threaded through a webbed portion 49 connecting the runways 25 and 26. With this arrangement, the bolt 48 may be adjusted to locate the extension 47 and thereby correctly position the arms 35 and 36 to fit various diameters of work pieces. The upper portion of the stud 48 is provided with a smooth surface which passes through another web 50 connecting the runways 25 and 26. The upper surface of this web 50 is located at the correct distance from the top of each runway to provide an effective rest or stop for the lower portion of the arm 35, when the work cradle is tilted to its loading position so that the top of the arm will be flush with or beneath the surface of the runway.

To operate this device, it is necessary for the operator to adjust the arms 35 and 36, by means of the stud 37, in order to fit the diameter of work to be ground. To check the rearward motion of the work cradle and prevent damage to the wheel or the work piece, the stud 48 is extended far enough from the webbed portion 49 to effectively contact with the extension 47 of the arm 36 when it is in the elevating position. The work 18 is laid on the front edge of the runways and rolled into the work cradle, while the arms 35 rest on the webs 50. The momentum gained by the work piece in rolling down the runway into the work cradle is sufficient to provide the main lifting force, but may be assisted, if necessary, by a slight push by the operator to tilt the cradle about its pivot point and raise the work to a position substantially in alignment with the work supporting centers, but slightly lower than the normal grinding position. An inward motion of the tailstock centers produced by the turning of the hand wheel 17 will relatively wedge the conical work supporting centers 15 and 16 into the work centers and lift the work from the cradle after which any relative motion of these supporting centers towards each other will align the work into the correct grinding position. After the grinding operation, the work 18 is dropped into the cradle by the withdrawal of the centers 15 and 16 and thereby in position to be carried frontwardly by the forward movement of the work cradle to its loading position.

Having thus described my invention, what I claim as new and desire to secure by Letters Patent is:

1. A machine tool having a cutting tool, relatively movable work supporting centers, and a work presenting mechanism fixed on the machine comprising a runway having a surface extending rearwardly from the front of the machine towards the cutting tool and by means of which the work may be moved from the front of the machine into a position adjacent to the centers where it may be gripped by the centers and elevated to the cutting position, said mechanism remaining in a work receiving position close to the work during the cutting operation.

2. A machine tool comprising a cutting tool, a work table, relatively movable work supporting centers thereon, and a rearwardly inclined guide way so arranged that the work may be moved thereon from the front of the machine into a position adjacent to the work centers and supporting means to lift the work from the runway and hold it indefinitely in a position where it may be engaged and lifted by the work centers.

3. A machine tool comprising a cutting tool, a work table, relatively movable work supporting centers thereon, a stationary runway on said table and a support pivotally mounted on and cooperating with the runway to convey the work therefrom into substantial alignment with the centers.

4. A machine tool comprising a cutting tool, relatively movable work supporting centers, a runway on which the work may be moved from the front of the machine into a position adjacent to the centers and an elevating mechanism including a cradle movably mounted to receive the work from said runway and move it into a position adjacent to the work centers and maintain it in such position for an indefinite period of time.

5. A work loading device for attachment to a machine tool having a cutting tool and relatively movable work supporting centers, comprising a work cradle arranged to support and locate a single piece of work and a pivot therefor located on the cutting tool side of a plane passing through the work axis when first positioned thereon and about which the cradle and the work piece located therein may be tilted to elevate the work for engagement by the centers.

6. A work loading device for a machine tool having relatively movable work supporting centers, comprising a work cradle having relatively adjustable arms arranged to support work pieces of different sizes, and means cooperating with the cradle permitting the work to be elevated to a desired extent for engagement with the work centers.

7. A work loading mechanism for a machine tool having relatively movable work supporting centers comprising a runway on which the work may be moved from the front of the machine into a position adjacent to the centers, a work cradle arranged to receive the work from the runway and having adjustable arms to accommodate different diameters of work pieces and a pivotal mount for the cradle so arranged that the cradle may be tilted to elevate the work thereon into an operative position adjacent to the work centers.

8. A work loading device for a machine tool having a cutting tool and relatively movable work supporting centers, comprising a work cradle arranged to support the work thereon, a pivot therefor permitting the cradle to tilt rearwardly and elevate the work to a point adjacent to the centers, and means cooperating with said cradle to limit its rearward motion towards the cutting tool.

9. A work loading device for a machine tool having relatively movable work supporting centers, comprising a runway on which the work may be moved from the front of the machine into a position adjacent to the centers, a work cradle having a forward arm and a rear arm arranged to hold a work piece, and a pivot for the cradle below the runway so arranged that the forward arm may lie below the runway and permit the work to roll into the cradle, said arms and pivot being so arranged that the center of the work will lie in front of a vertical plane passing through the pivot when the forward arm is below the runway, whereby the work may be elevated by tilting the cradle.

10. A machine tool comprising a cutting tool, relatively movable work supporting centers, a stationary runway presenting a track for a round work piece to roll thereon which extends from the front of the machine towards the centers and an adjustable stopping device cooperating with the runway to stop the work in position adjacent to the centers and out of contact with the cutting tool.

11. A grinding machine comprising a base, a grinding wheel, a table on the base, relatively movable work supporting centers on the table, a work loading device, and means for removably fastening the device on the table between the centers, said device including a runway having a track along which the work piece may roll, a movable cradle arranged to receive the work from the runway and an adjustable stop cooperating with the cradle so arranged that the cradle may be moved to a limited extent and elevate the work to a position near the centers.

Signed at Worcester, Massachusetts, this 20th day of June, 1928.

WALLACE H. WOOD.